Nov. 28, 1961   H. W. SCHMITZ ET AL   3,010,136
WINDSHIELD CLEANING MECHANISM
Filed July 26, 1957   5 Sheets-Sheet 1

INVENTORS
HARRY W. SCHMITZ
LYMAN H. TURNER
EUGENE R. ZIEGLER
BY M. H. Strickland
THEIR ATTORNEY Nov. 28, 1961   H. W. SCHMITZ ET AL   3,010,136
WINDSHIELD CLEANING MECHANISM
Filed July 26, 1957   5 Sheets-Sheet 5

INVENTORS
HARRY W. SCHMITZ
LYMAN H. TURNER
EUGENE R. ZIEGLER
BY  M. H. Strickland
THEIR ATTORNEY 3,010,136
WINDSHIELD CLEANING MECHANISM
Harry W. Schmitz, Rochester, Lyman H. Turner, Green Valley, and Eugene R. Ziegler, Spencerport, N.Y., assignors to General Motors Corporation, Detroit, Mich., a corporation of Delaware
Filed July 26, 1957, Ser. No. 674,495
15 Claims. (Cl. 15—250.02)

This invention pertains to the art of windshield cleaning and particularly to mechanism for actuating windshield wipers alone or conjointly with means for spraying liquid solvent onto the windshield.

Heretofore, it has been proposed to impart asymmetrical oscillation to a pair of spaced wiper blades across the surface of a windshield by means of a rotary drive motor. In order to vary the paths of movement of the wiper blades to achieve depressed parking, that is, parking outside of the normal wiping stroke, with a rotary driving motor, the effective lengths of the crank arms can be varied by incorporating an eccentric on each crank pin together with means for controlling the positions of the eccentrics. In instances where the rotary drive motor takes the form of a reversible electric motor the positions of the eccentrics can be arranged to depend upon the direction of rotation of the motor. The present invention relates to actuating mechanism of the type including a unidirectional rotary electric motor which utilizes a single eccentric to control the orbits of a pair of crank pins so as to shift the paths of movement of the wiper blades and achieve depressed parking. In addition, the wiping mechanism includes means for increasing the amplitude of oscillation between the connecting rods driven by the rotary cranks and the wiper arms by movement amplifying transmissions. Furthermore, the rotary driving motor can form a component of a windshield cleaning system wherein the rotary motor can be drivingly connected with a washer pump by control means which time the operation of the washer pump, automatically operate the wiper motor at high speed during the wash cycle, reduce the speed of the wiper motor during a timed drying cycle and thereafter deenergize the wiper motor with the wiper blades in the parked position.

Accordingly, among our objects are the provision of a windshield wiper actuating mechanism including a rotary driving member for rotating a crank having a crank pin and means for varying the orbit of the crank pin; the further provision of wiper actuating mechanism including a unidirectional rotary motor and eccentric means for varying the orbital paths of a pair of crank pins driven thereby; the further provision of wiper actuating mechanism including electromagnetic means for controlling the path of movement of an output member; the further provision of means for increasing the motion between a connecting rod driven by a rotary crank and an oscillatory member driven thereby; and the still further provision of a windshield cleaning system including a washer pump and a wiper motor having automatic means for controlling the speed of the wiper motor during the washing and drying cycle.

The aforementioned and other objects are accomplished in the present invention by incorporating electromagnetic means for controlling the wiper actuating mechanism and electromagnetic means for controlling the driving mechanism between the wiper motor and the washer pump as well as for automatically controlling coordinated operation of the wiper motor during washing and drying cycle. Specifically, the windshield cleaning system includes a unidirectional electric motor which is drivingly connected to a shaft through suitable reduction gearing comprising a worm and a worm gear. The rotary shaft has a crank assembly connected therewith comprising a first crank arm rotatably journalled on an eccentric which is likewise rotatably journalled on the shaft. The first crank arm has a crank pin extending therefrom which slideably receives a drive arm attached to the shaft. The first crank pin has a second crank arm oriented at an angle thereto which has a second crank pin at its free end. The eccentric has a pair of oppositely extending diametrically opposed lugs which are engageable with an abutment, to be described, that determines the running and parking positions of the eccentric. A spring washer of the Belleville type is interposed between a flange on the eccentric and the crank arm, the spring washer constituting a friction device which prevents backward movement of the eccentric under load and also assists in establishing a driving connection between the eccentric and the first crank arm for moving the eccentric between the running and parking positions.

When the eccentric is in the running position, the two crank pins, which have a fixed relation to each other at all times, rotate in an orbit having as its center, the center of the eccentric which is displaced on one side of the center of the driving shaft. When the eccentric is in the parked position the orbits of the crank pins are changed so that the center of their orbits is on the other side of the driving shaft.

Each crank pin is connected to the inner end of a connecting rod. The outer ends of the connecting rods are connected to crank pins on drive levers of double lever, movement amplifying transmission assemblies. The movement amplifying transmission assemblies comprise drive and driven levers, the drive lever being attached to a stub shaft and the driven lever being attached to the wiper arm output shaft, the axis of the wiper arm output shaft being disposed between the stub shaft and the outer end of the drive arm. The crank pin attached to the outer end of the drive lever extends through a radial slot in the driven lever, and since the axis of the output shaft is closer to the crank pin than the axis of the drive lever stub shaft, the angular movement imparted to the driven lever is proportionately greater than the angular movement imparted to the drive lever. Since it is well recognized that it is impractical to directly obtain an angular movement of more than 90° from a rotating crank pin, with the movement amplifying lever system any desired amplitude of oscillation can be imparted to the output shaft, which in the present instance is 115°.

As alluded to hereinbefore, the electric motor for actuating the wiper blades through crank and linkage mechanism constituting a wiper unit can also be drivingly connected to a washer unit comprising a pump and a control assembly. The washer pump is similar to that disclosed in copending application S.N. 634,867 filed January 18, 1957, in the name of Eugene R. Ziegler and assigned to the assignee of this invention, now Patent No. 2,878,505. Thus, the worm gear driven by the electric motor has a cam integral therewith arranged to actuate a pivotally mounted cam follower assembly having a lost motion driving connection with a reciprocable pump rod. The cam follower assembly has a pawl connected thereto for rotating a ratchet wheel which constitutes a stroke counting means. The ratchet wheel is formed as an integral part of a ratchet cam assembly having cam surfaces for interrupting the driving connection between the cam follower assembly and the pump rod; for controlling a switch in a washer electromagnet energizing circuit; for positioning a pawl control ramp; and for controlling a high and low speed switch for the motor whereby during the washing cycle the motor is operated at high speed and during the drying cycle the motor is operated at low speed.

The control system for the windshield cleaning mechanism includes a manual switch having an "off," "low" and "high" speed position and a washer control switch of the momentary contact closure type. The abutment for determining the position of the eccentric is constituted by an armature of a wiper unit relay, or electromagnet, the coil of which is energized upon closure of either the manual wiper control switch or the washer switch. The electromagnet includes a second armature which carries a parking switch, the arrangement being such that when the coil is energized the parking switch is moved out of operative engagement with a parking cam and thus closes the energizing circuit for the motor. In order to reduce the size of the electromagnet required for actuating the armatures, the eccentric controlling armature is mechanically moved towards the core of the electromagnet by the crank arm rotatably journalled on the eccentric, after which it is retained in the running position by the electromagnet.

During running operation the orbits of the crank pins have a center disposed on one side of the worm gear shaft so that the wiper blades are moved through their wiping strokes at either "high" or "low" speed. When the manual switch is moved to the "off" position, the electromagnet is deenergized and the armatures are moved by springs to the parking position. During continued rotation of the first crank arm the eccentric is driven frictionally from the running position to the parking position thereby shifting the orbits of the crank pins. When the wiper blades arrive at the parked position a cam formed on the first crank arm will open the parking switch to deenergize the motor.

The washer control also includes a washer unit electromagnet having an armature constituting a ramp for interrupting the drive connection between the drive pawl and the ratchet wheel. When the washer switch is closed momentarily, with the manual wiper switch in the "off" position, to initiate coordinated washer unit and wiper unit operation, the ramp is lifted so as to establish a driving connection between the pawl and the ratchet wheel. After movement of the ratchet wheel through the distance of one tooth the ramp is mechanically held in a position maintaining the driving connection between the pawl and the ratchet wheel by a cam surface on the ratchet cam assembly. In addition, after movement of the ratchet wheel throughout one tooth, the wiper unit relay, or electromagnet, is energized by a switch controlled by the cam assembly throughout the remainder of a complete revolution of the ratchet wheel. During the first 180° of rotation of the ratchet cam the pump is actuated intermittently and discharges liquid solvent onto the windshield. At this time, the motor is operated at high speed since the cam assembly controls a switch which opens the shunt field winding. During the last half revolution of the ratchet cam the pump is not actuated and the shunt field winding is energized so that the motor operates at low speed. When the ratchet cam arrives at its initial position the wiper unit relay is deenergized and thus the wiper mechanism moves the blades to the parked position after which the wiper motor is deenergized. However, if the manual wiper unit switch is in either "high" or "low" speed position when the washer switch is closed, the wiper unit will continue to operate at the manually set speed after the coordinated wash and dry cycle is completed.

Further objects and advantages of the present invention will be apparent from the following description, reference being had to the accompanying drawings, wherein a preferred embodiment of the present invention is clearly shown.

Figure 1:
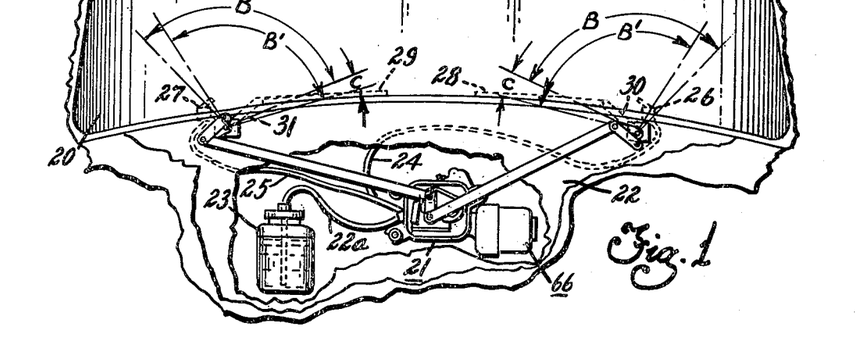
FIGURE 1 is a fragmentary view with certain parts broken away of a vehicle equipped with the windshield cleaning mechanism of this invention.

With particular reference to FIGURE 1, a portion of a vehicle is shown including a windshield 20. In FIGURE 1 the view is taken from inside of the vehicle looking towards the front from which it can be seen that the washer unit and the wiper unit, designated generally by the numeral 21 are mounted on the inside of the firewall 22. The washer unit is connected by an inlet hose 22a to a reservoir 23 which is suitably supported in the engine compartment. In addition, the washer unit includes delivery hoses 24 and 25 which are connected to spaced washer nozzles 26 and 27, respectively, mounted on the cowl of the vehicle and arranged to discharge liquid onto the surface of the windshield in a conventional manner. The vehicle is equipped with a pair of wiper blades 28 and 29 which are oscillatable over assymmetrical paths including a wiping path as indicated by the letter B and a parking path designated by the letter B', from which it can be seen that the parking path B' is shifted relative to the wiping path B through angle C so that the wiper blades come to rest against the cowl of the vehicle in what is known as a depressed parking position.

Figure 2:
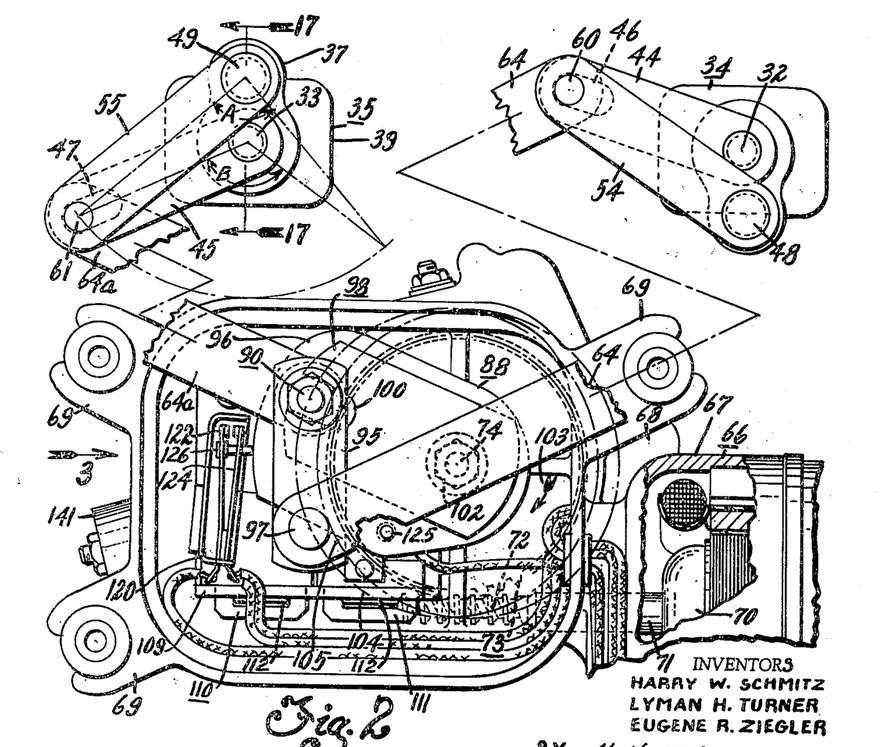
FIGURE 2 is a fragmentary view, partly in section and partly in elevation, of a wiper unit constructed according to this invention.

The wiper blade 28 is connected to a wiper arm 30 and the wiper blade 29 is connected to the wiper arm 31. With particular reference to FIGURE 2, the wiper arms 30 and 31, are connected to wiper actuating shafts 32 and 33, respectively. The wiper actuating shafts 32 and 33 constitute part of spaced transmission assemblies designated generally by the numerals 34 and 35.

Figure 17:
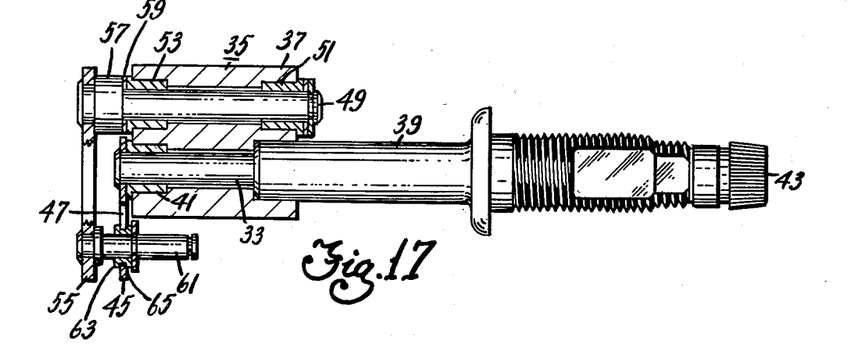
FIGURE 17 is a view, partly in section and partly in elevation, taken along line 17—17 of FIGURE 2 showing the interconnection between the driving and driven levers on a transmission assembly.

With particular reference to FIGURES 2 and 17, the transmission assembly 35 will be described in detail, the transmission assembly 34 being identical therewith except as hereinafter pointed out. The transmission assembly 35 includes a bracket 37 having a housing 39 suitably affixed thereto. The housing extends through the cowl of the vehicle and is rigidly attached thereto. The wiper actuating shaft 33 is rotatably journalled at its inner end by a bushing 41 in the bracket 37, and is likewise rotatably supported within the housing 39 by bushings, or sleeve bearings, not shown. The outer end of the shaft 33 has a drive burr 43 attached thereto which is drivingly connected with the wiper arm 31. The inner end of the shaft 33 has a crank arm 45 rigidly connected thereto, the crank arm 45 having an elongated slot 47 therein.

A stub shaft 49 is rotatably supported in the bracket by spaced bushings 51 and 53. A crank arm 55 is rigidly attached to the stub shaft 49, a sleeve spacer 57 and a washer 59 being interposed between the crank arm 55 and the bushing 53. The crank arm 55 has attached thereto a crank pin 61 which extends through the slot 47 in the crank arm 45, the crank pin 61 has a follower 63 slidably mounted thereon between its ends, the follower 63 having an annular groove 65, as shown, which receive the side walls of the slot 47 in the crank 45. It is pointed out that the axis of the output shaft 33 is parallel to the axis of the stub shaft 49 but is disposed between the stub shaft 49 and the crank pin 61. This double lever arrangement constitutes a movement amplifying device, and as shown in FIGURE 2, as the crank arm 55 is oscillated throughout angle A, the crank arm 45 is oscillated throughout angle B. In the particular embodiment disclosed, the crank arm 55 is oscillated throughout an angle of 90° from a rotating crank pin through a connecting rod whereas the crank arm 45 is oscillated throughout an angle of 115°. If the axis of the shaft 33 is moved closer to the axis of the shaft 49 the amplitude of oscillation of shaft 33 will decrease, and vice versa.

The transmission assembly 34 likewise includes a crank arm 44 connected to the shaft 32 and a crank arm 54 connected to a stub shaft 48. The crank arm 54 has a crank pin 60 which extends through a slot 46 in the crank arm 44. However, as seen in FIGURE 2, in order to impart asymmetrical movement to the spaced wiper blades 28 and 29 with the mechanism disclosed, the crank arms 44 and 54 extend above the shaft 32 whereas the crank arms 45 and 55 extend below the shaft 33. Crank pin 60 is connected to the outer end of a connecting rod 64 and crank pin 61 is connected to the outer end of a connecting rod 64a.

The washer unit and wiper unit 21 includes a unidirectional electric motor 66, as seen in FIGURE 2. The motor 66 includes an end cap 67 which, as shown, is integral with a crank housing 68 having brackets 69 for attaching it to the firewall 22. The motor 66 includes an armature 70 and a shaft 71 with an integral worm 72. The worm 72 meshes with a worm gear 73 attached to a shaft 74 rotatably supported within the housing 68.

Figures 3, 4, 5, 6:
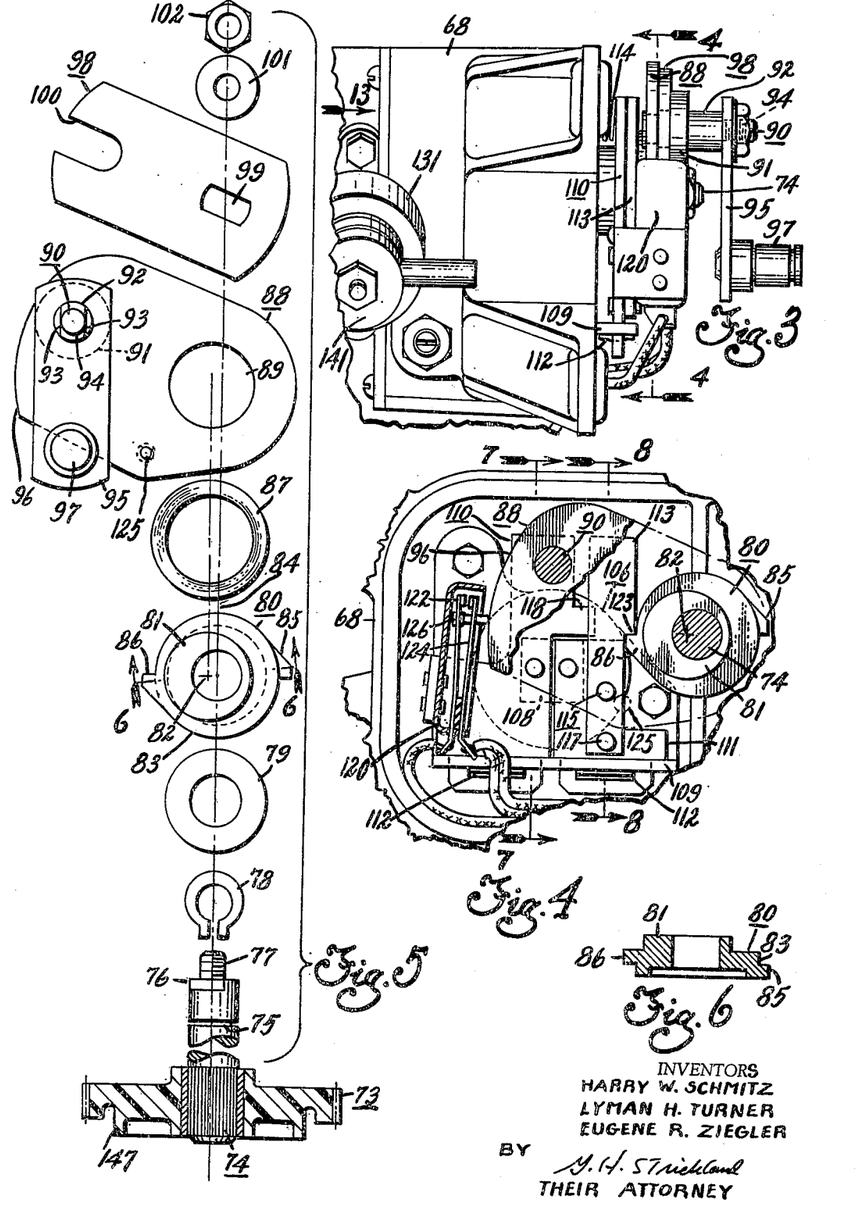
FIGURE 3 is a fragmentary view in elevation with certain parts removed taken in the direction of arrow 3 of FIGURE 2.
FIGURE 4 is a fragmentary view with certain parts broken away taken along line 4—4 of FIGURE 3.
FIGURE 5 is an exploded view of the crank assembly of the wiper unit, partly in section and partly in elevation.
FIGURE 6 is a sectional view of the eccentric taken along line 6—6 of FIGURE 5.

With particular reference to FIGURE 5, the crank assembly for actuating the connecting rods 64 and 64a will be described. The worm gear shaft 74 is formed with an annular groove 75, a pair of flats as indicated by numeral 76 and a threaded portion 77. A snap ring 78 is situated in the annular groove 75 and a washer 79 is placed thereover. An eccentric 80 is rotatably journalled on the shaft 74 and supported on the washer 79. As seen particularly in FIGURES 5 and 6 the eccentric 80 includes a hub portion 81 having its center 82 displaced from the center of shaft 74. The eccentric 80 also includes a flange 83 concentric with the axis 84 of the shaft 74, the flange 83 including a pair of diametrically opposed lugs 85 and 86 which are displaced axially relative to each other. That is, lug 85 is axially spaced from the worm gear 73 a lesser distance than the lug 86. A spring washer 87 of the Belleville type is placed on top of the eccentric 80 in engagement with the flange 83. A first crank arm 88 is formed with an aperture 89 which receives the eccentric hub of the eccentric 80. The crank arm 88 is rotatably journalled on the eccentric hub 81 with the spring washer 87 being interposed between the crank arm 88 and the flange 83 of the eccentric. The spring washer serves two purposes in the crank assembly, namely to prevent backwards rotation of the eccentric under load and to establish a frictional driving connection between the crank arm 88 and the eccentric 80 as will be pointed out more particularly hereinafter.

The crank arm 88 has a crank pin 90 rigidly attached thereto adjacent its outer end, the crank pin 90 having a spacer sleeve 91 disposed between its ends, a bearing portion 92, a pair of flats 93 and a threaded portion 94. The crank arm 88 also includes a cam surface 96. A second crank arm 95 is rigidly attached to the crank pin 90 and oriented at an angle thereto when viewed in a direction parallel to the axis of rotation of the shaft 74. The crank arm 95 has an aperture arranged to snugly receive the flats 93 on the crank pin 90. In addition, the crank arm 95 has a crank pin 97 rigidly attached thereto adjacent to its outer end. A drive arm 98 having an aperture 99 arranged to snugly receive the flats 76 on the shaft 74 is positioned on top of the crank arm 88. The drive arm 98 has a slot 100 at its outer end arranged to slidably receive the portion of the crank pin 90 between the crank arm 88 and the sleeve spacer 91. The entire crank assembly is maintained in assembled relation with the shaft 74 by a nut 102 which engages the threaded portion 77, a suitable washer 101 being interposed between the nut 102 and the drive arm 98.

Figure 10:
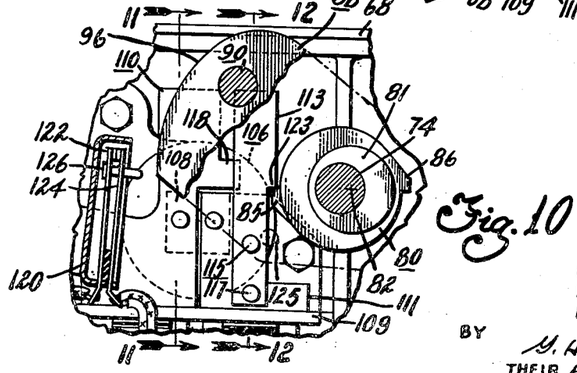
FIGURE 10 is a fragmentary view partly in section and partly in elevation similar to FIGURE 4 showing the parts in the running position.

Referring again to FIGURE 2, the motor 66 is of the unidirectional type, and upon energization thereof, will effect rotation of the worm gear 73 in the clockwise direction as indicated by arrow 103. The inner end of the connecting rod 64a is rotatably mounted on the bearing portion of the crank pin 90. The crank pins 90 and 97 are radially spaced the same distance from the center 82 of the eccentric 80. When the center 82 of the eccentric is located to the left of the center of the shaft 74 as shown in FIGURE 4, the orbits of the crank pins 90 and 97 are as indicated by broken line 104. At this time, the wiper blades 28 and 29 are moved throughout the angle B' which is equal to the angle B but displaced therefrom throughout angle C. On the other hand, when the center 82 of the eccentric is located on the right hand side of the center of the shaft 74 as indicated in FIGURE 10, the orbits of the crank pins 90 and 97 will be as indicated by the broken line 105, at which time the blades 28 and 29 will be moved throughout angle B, this being the wiping stroke. It is pointed out that the eccentric 80 has shifted 180° between the positions it is shown in in FIGURE 4 and FIGURE 10, and this movement of the eccentric shifts the paths of movement of the wiper blades, and effectively increases the throw of the crank pins 90 and 97.

With particular reference to FIGURES 4 through 12, the manner in which the eccentric is controlled and moved between its running position of FIGURE 10 and its parking position of FIGURE 4, and vice versa, will be described. The housing 68 has disposed therein an electromagnet 106 including a coil 107 and a core 108. The electromagnet is carried by a bracket 109 suitably secured to the housing 68. The bracket 109 pivotally supports a pair of armatures 110 and 111, the armatures 110 and 111 extending through slots in the bracket 109 and retained thereby by spring clips 112. The armature 110 is urged away from the core 108 by a coil spring 114, the inner end of which is positioned over a spring guide 116 formed as an integral part of the housing 68. The armature 111 has a plate 113 attached thereto by rivets 115 and 117. The rivet 115 has a round head as indicated by numeral 119 whereas the rivet 117 has a flat head. The plate 113 and the armature 111 are normally urged away from the core 108 by a coil spring 119, the inner end of which is supported by a spring guide 121 integral with the housing 68.

As seen particularly in FIGURES 4 and 10, the armature 110 has a lug portion 118 disposed beneath the plate 113. The function of this portion 118 is to assure movement of the armature 111 and the plate 113 from the position of FIGURE 12 to the position of FIGURE 8 upon deenergization of the coil 107. In other words, both springs 114 and 119 assist in moving the armature 111 away from the core 108 when the coil 107 is deenergized.

The armature 110, as seen in FIGURE 4, has a switch housing 120 attached thereto, the switch housing enclosing a pair of leaf spring contact blades 122 and 124 which are normally biased into engagement. The contact spring 122 has a pin 126 of insulating material attached thereto which extends through a slot in the contact spring 124 and without the housing 120. The pin 126 can be engaged by the cam surface 96 on the crank arm 88 when the coil 107 is deenergized and the armature 110 is in the position shown in FIGURES 4 and 7; the pin 126 is located in the plane of the crank arm 88. However, when the coil 107 is energized and the armature 110 is in the position of FIGURE 11 the pin 126 is moved out of the plane of the crank arm 88. The cam portion 96 on the crank arm 88 is arranged to engage the pin 126 and separate the contacts 122 and 124 with the wiper blades at the parked position as indicated in FIGURE 1.

The plate 113 has a shoulder 123 formed thereon constituting a movable abutment means for engaging either of the lugs 85 or 86 of the eccentric 80. When the armature 111 is in the position of FIGURES 4 and 8, the shoulder 123 on the plate 113 will be disposed in the plane of the lug 86. However, when the coil 107 is energized and the armature 111 is in the position of FIGURES 10 and 12, the shoulder 123 will be in the plane of the lug 85. The eccentric 80 is driven between the parked position of FIGURE 4 and the running position of FIGURE 10, and vice versa, through the frictional drive constituted by the Belleville spring 87 and the crank arm 88. Assuming the eccentric to be in the parked position as shown in FIGURE 4, a complete cycle of operation will be described.

Figures 7, 8, 9:
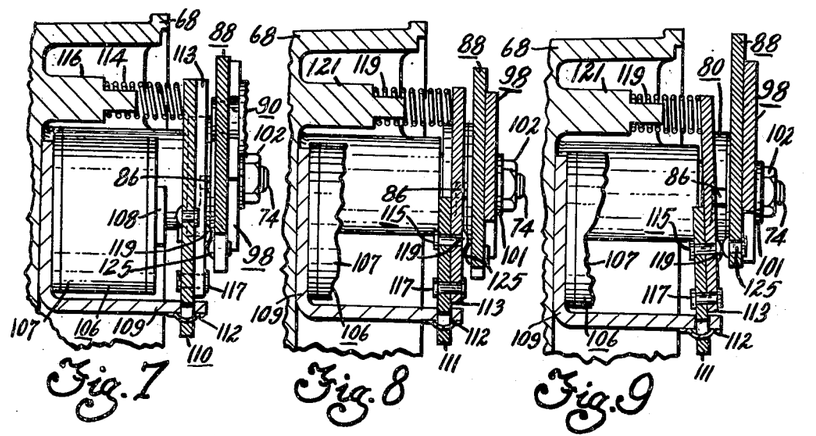
FIGURE 7 is a sectional view taken along line 7—7 of FIGURE 4 with the crank mechanism in the parked position.
FIGURE 8 is a sectional view taken along line 8—8 of FIGURE 4.
FIGURE 9 is a view similar to FIGURE 8 of the mechanism going from the parked to the running position.
Figure 11:
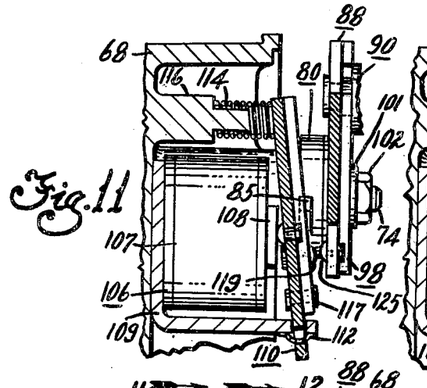
FIGURE 11 is a sectional view taken along line 11—11 of FIGURE 10 with the mechanism in the running position.

Upon energization of the coil 107, the armature 110 moves from the position of FIGURE 7 to the position of FIGURE 11 thereby moving the pin 126 out of the plane of the crank arm 88 so that the switch blades 122 and 124 will be in engagement. As will be pointed out more particularly hereinafter, the motor 66 will then be energized and impart clockwise rotation to the shaft 74 and the crank arm 88 through the drive arm 98 as viewed in FIGURE 2. The armature 111 will remain in the position of FIGURE 8 due to frictional engagement between the lug 86 and the shoulder 123. However, upon rotation of the crank 88 in the clockwise direction a round headed rivet 125 attached to the crank arm 88 will engage the round headed rivet 119 as seen in FIGURE 9 and move the plate 113 and the armature 111 towards the core 108. This mechanical displacement of the armature 111 by the crank arm 88, which power is derived from the motor 66, will reduce the air gap between the core 108 and the armature 111 so that the armature 111 will be attracted to the core and move to the position of FIGURE 12. When the armature 111 and the plate 113 are in the position of FIGURE 12, the shoulder 123 is disengaged from the lug 86 and moved into the plane of the lug 85. Accordingly, upon continued rotation of the crank arm 88 in the clockwise direction, the eccentric 80 will be driven from the position of FIGURE 4 to the position of FIGURE 10 wherein the lug 85 engages the shoulder 123. During this movement the center 82 of the eccentric hub 81 has shifted from the left hand side of the axis of shaft 74 to the right hand side thereof so that the wiper blades 28 and 29 are oscillated throughout the angle B which constitutes their wiping paths.

Figure 12:
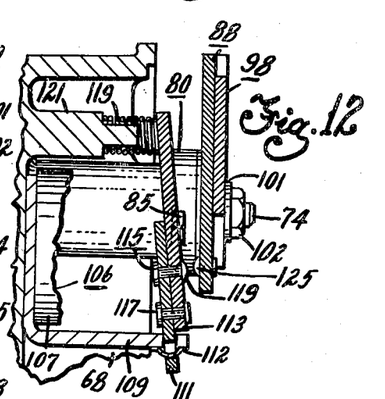
FIGURE 12 is a sectional view taken along line 12—12 of FIGURE 10 with the mechanism in the running position.

Upon deenergization of the coil 107, the armatures 110 and 111 will move from the position of FIGURES 11 and 12, respectively, to the position of FIGURES 7 and 8, respectively. As pointed out hereinbefore the plate 113 is disengaged from the lug 85 by the force from springs 114 and 119 since the lug portion 118 of the armature 110 engages the plate 113. Accordingly, rotation of the crank arm 88 will drive the eccentric 80 from the position of FIGURE 10 to the position of FIGURE 4 since the shoulder 123 is now located in the plane of the eccentric lug 86. Movement of the eccentric 80 from the position of FIGURE 10 to the position of FIGURE 4 will shift the orbits of the crank pins 90 and 97, since the center 82 of the eccentric hub 81 is now located to the left of the center of shaft 74. Accordingly, the wiper blades will move throughout path B′ and will automatically come to rest in the parked position against the cowl of the vehicle when the cam surface 96 of the crank arm 88 engages the pin 126 and moves contact spring 122 out of engagement with contact spring 124 so as to deenergize the motor 66.

Figure 13:
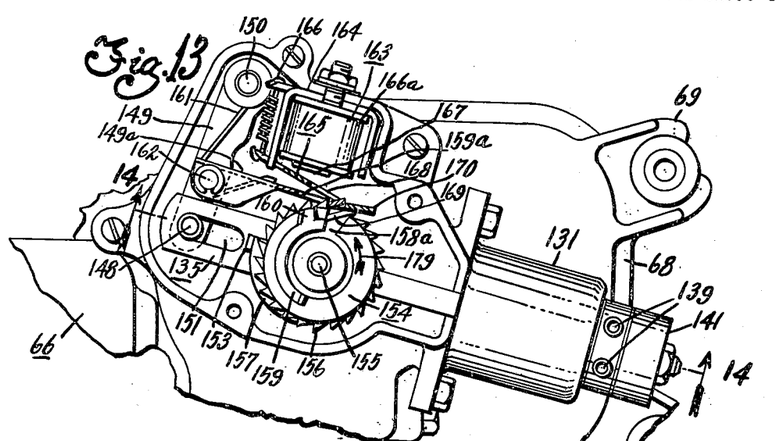
FIGURE 13 is a fragmentary view of the washer unit taken generally in the direction of arrow 13 of FIGURE 3 with the cover removed.
Figure 14:
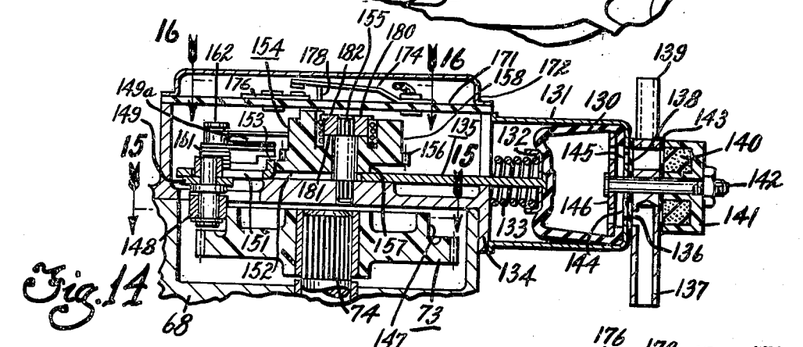
FIGURE 14 is a fragmentary sectional view taken along line 14—14 of FIGURE 13.

With particular reference to FIGURES 3 and 13 through 15, the cleaning mechanism of this invention also includes a washer unit including a bellows type pump 130 disposed within a casing 131 which is attached to the housing 68. As seen in FIGURE 14, the bellows 130 is engaged by a spring seat 132, a coil spring 133 being interposed between the spring seat 132 and a housing 134 attached to the housing 68. The spring seat 132 is attached to one end of a reciprocating pump rod 135. The interior of the bellows 130 can be connected through a one-way inlet, flap-type check valve 136 to an intake nipple 137 which is connected to the intake hose 22a. The interior of the bellows 130 can also communicate through an outlet flap type check valve 138 with a pair of delivery nipples 139 which are connected to the delivery hoses 24 and 25. In order to smooth out the pulsation of the pump, if desired, a sponge 140 disposed within a casing 141 may be attached by means of a stud 142 to the pump, the sponge communicating with the delivery nipples 139 through a perforated gasket 143. The check valves 136 and 138 are formed as an integral part of a rubber gasket of conventional construction and are arranged to coact with openings 144 and 145, respectively, in the inwardly flanged portion of the casing 131. The end of the bellows 130 is clamped between a perforated plate 146 and the housing 131 by the stud 142.

Figure 15:
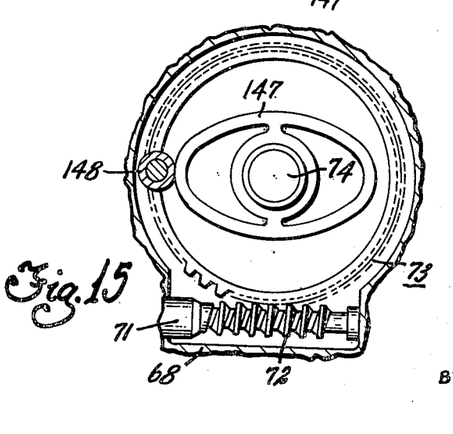
FIGURE 15 is a fragmentary view partly in section and partly in elevation, taken along line 15—15 of FIGURE 14.

The bellows pump 130 can be actuated by the motor 66 through an interruptible driving connection. Thus, as shown in FIGURES 14 and 15, the worm gear 73 is formed with an integral two-lobe cam 147. The cam 147 is engaged by a roller type follower 148 carried by a follower arm 149 pivotally supported in the housing 134 by a pin 150. The follower 148 also includes a portion which extends through an elongated slot 151 in the pump rod 135. The pump rod 135 is formed with a second elongated slot 152, the two slots 151 and 152 being separated by an upstruck portion 153 constituting a cam follower. The washer unit control mechanism includes a ratchet cam assembly generally designated by the numeral 154, which is rotatably supported on a stub shaft 155 rigidly attached to the housing 134. The stub shaft 155 extends through the slot 152 in the pump rod 135. The ratchet cam assembly 154, which is composed of suitable insulating material, includes a ratchet wheel 156, as well as cam surfaces 157, 158, 159 and 160. The cam surface 157 extends throughout substantially 180° and terminates in abrupt shoulders as indicated in FIGURE 13. Cam surface 157 can be engaged by a cam follower lug 153 on the pump rod 135.

The arm 149 has a drive pawl 149a pivotally attached thereto by means of a pin 162. The drive pawl is urged into contact with the ratchet wheel 156 by a torsion spring 161, one end of which engages the pivot pin 150 and the other end of which engages the drive pawl 149a, the spring 161 having several turns about the pivot pin 162 as shown in FIGURE 14. The drive pawl 149a has a slot 159a therein, the end of which is engageable with the teeth of the ratchet wheel 156. In order to prevent continuous operation of the washer pump and rotation of the ratchet cam assembly 154, the washer control includes an electromagnet 163 comprising a frame 164 having an armature 165 pivotally connected thereto and biased to the position shown in FIGURE 13 by a spring 166. The electromagnet 163 includes a coil 166a and a core 167 to which the armature 165 is attracted upon energization of the coil. The armature 165 has a slot 168 therein formed by depressing a tang 169 from the body thereof and an end surface 170 constituting a ramp. When the coil 166a is deenergized with the ratchet cam assembly 154 in the position shown in FIGURE 13, the tang 169 is disposed in a notch 158a of the cam surface 58 so that the end of the drive pawl 149a rides up the ramp 170 during pivotal movement of the arm 149 and thus does not engage a tooth on the ratchet wheel.

Figure 16:
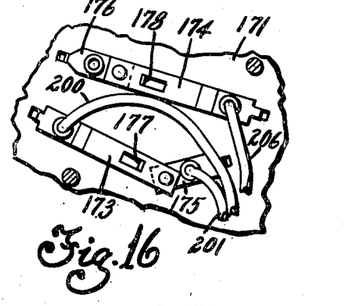
FIGURE 16 is a fragmentary view, partly in section and partly in elevation, taken along line 16—16 of FIGURE 14.

As seen particularly in FIGURES 14 and 16, the housing 134 is closed by a switch mounting plate 171 which is in turn enclosed by a cover 172. A pair of leaf spring switches comprising movable leaf spring contacts 173 and 174, and stationary contacts 175 and 176 are attached to the mounting plate 171. Each of the leaf springs 173 and 174 include an integral cam follower portion 177 and 178, respectively, which extend through slots in the mounting plate 171 and constitute followers for cam surfaces 159 and 160, respectively.

When the washer unit is in the "off" position, as shown in FIGURE 13, the cam follower 177 does not engage the cam 159, and thus contact 173 engages contact 175. At the same time the follower 178 is in engagement with the cam surface 160 so that contact 174 is spaced from contact 176. Movement of this ratchet cam 154 throughout a distance of one tooth in the counterclockwise direction as shown by arrow 179 will effect engagement of tang 169 of the armature 165 and the cam 158, engagement of contacts 174 and 176 since the follower 178 will no longer engage the cam 160; and separation of contacts 173 and 175 since follower 177 engages cam 159. During continued movement of the ratchet cam 154 in the counterclockwise direction, the contacts 176 and 174 will remain in engagement, and the contacts 173 and 175 will close after 180° rotation since the follower 177 will no longer engage the cam 159. Thus, during the remainder of a complete revolution of the ratchet cam 154 contact 174 will engage contact 176 and contact 173 will engage contact 175 until the ratchet cam 154 arrives at its starting position at which time the follower 178 will engage cam 160 and the tang 169 on the armature ramp will fall in the slot 158a thereby preventing further movement of the ratchet wheel by the drive pawl 149a.

The stub shaft 155 has a head portion 180 which is seated against a shoulder 181 of the ratchet cam 154. The head portion 180 is circumscribed by one end of a coil spring clutch 182, the other end of which circumscribes the shoulder 181. The coil spring clutch coacts with the ratchet cam 154 to prevent reverse rotation of the ratchet cam, that is, the spring clutch prevents rotation of the ratchet cam in the clockwise direction as viewed in FIGURE 13, since movement of the ratchet cam in this direction tends to wind up the spring whereupon the ratchet cam will be clutched to the fixed head portion 180.

The cam follower 148 has a lost motion driving connection with the pump rod 135, constituted by the slot 151. Thus, while the follower 148 is continuously actuated by the cam 147 during rotation of the worm gear 73 so as to effect pivotal movement of the cam follower arm 149 and thus reciprocate the drive pawl 149a, when the follower 153 on the pump rod 135 engages the cam surface 157, the pump rod 135 will not be reciprocated. However, as soon as the ratchet cam 154 moves throughout the distance of one tooth in the counterclockwise direction, the follower 153 is disengaged from the cam surface 157 thereby permitting the spring 133 to collapse the bellows 130 and effect a delivery stroke of the pump. As soon as the worm gear 73 moves throughout a quarter revolution in the counterclockwise direction as viewed in FIGURE 15, the cam follower 148 will engage the left hand end of the slot 151 and move the pump rod 135 so as to expand the bellows 130 and compress the spring 133, thereby allowing the bellows 130 to expand and complete the intake stroke. When the worm gear 73 has rotated 180° the pump rod 135 will be moved to the position shown in FIGURE 14, during which movement the pawl 149a will move the ratchet cam 154 throughout a distance of one tooth. Accordingly, during the next quarter revolution of the worm gear 73 the spring 133 will effect another delivery stroke of the pump 130. Thus, the pump will be intermittently actuated and deliver a series of intermittent squirts, or pulses, of liquid solvent onto the windshield throughout 180° of rotation of the ratchet cam 154. Since the cam 147 has two lobes, and since the wiper blades move throughout two strokes, that is an inboard stroke and an outboard stroke, during each revolution of the gear 73, the washer unit will deliver one squirt, or pulse, of liquid solvent during each stroke of the wiper blades. The ratchet cam constitutes a stroke counting means since the ratchet cam moves through a distance of two teeth throughout every complete revolution of the worm gear 73. After the ratchet cam is rotated 180° from its starting position, the follower 153 will reengage the cam 157 and thus interrupt the driving connection between the cam follower 148 and the pump rod 135. The first 180° rotation of the ratchet cam 154 constitutes a washing cycle and the last 180° rotation thereof constitutes a drying cycle. The drying cycle is of a predetermined time interval and also of a predetermined number of strokes as determined by the ratchet cam 154. In the disclosed embodiment, the wiper blades 28 and 29 make six complete strokes during the washing cycle and six complete strokes during the drying cycle after which they are automatically parked in a manner to be described.

Figure 18:
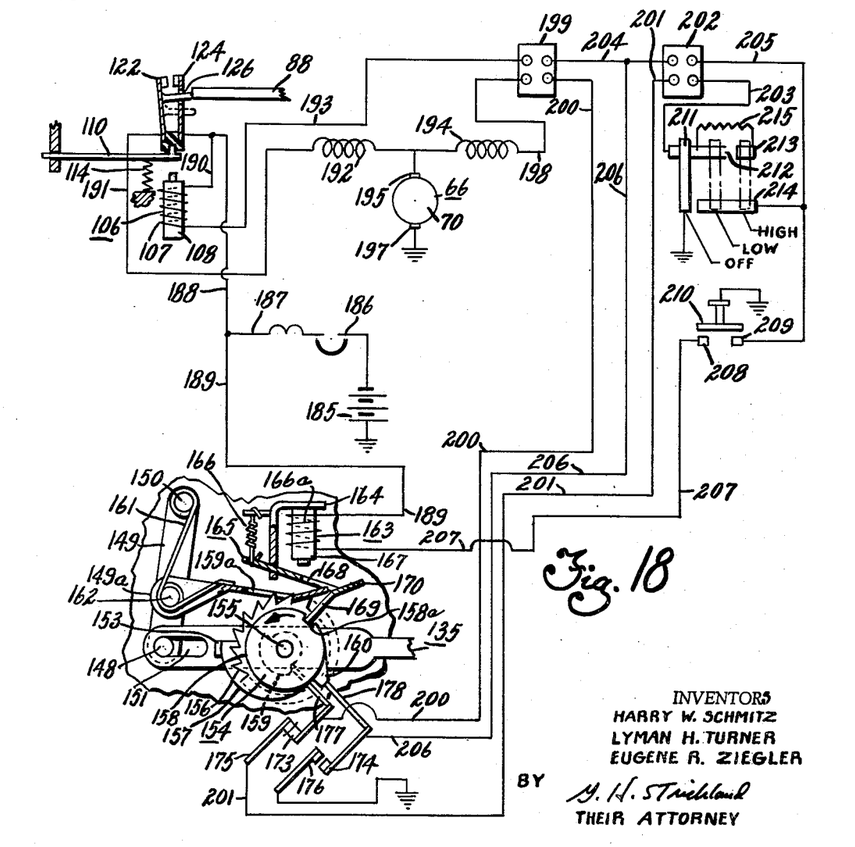
FIGURE 18 is a schematic wiring diagram of the control system for the windshield cleaning mechanism.

With particular reference to FIGURE 18, the electric control system for the cleaning system of this invention will be described. As shown in FIGURE 18, one terminal of a battery 185 is connected to ground and the other terminal of a battery 185 is connected through a thermal overload switch 186 to a wire 187. Wire 187 is connected to wires 188 and 189. Wire 188 connects with a wire 190 and with switch contact 124 of the parking switch. Switch contact 122 of the parking switch is connected to a wire 191 which is connected to one end of the series field winding 192 of the motor 66. The wire 190 is connected to one end of the wiper unit electromagnet coil 107, the other end of which is connected to a wire 193. The motor 66 is of the cumulative compound wound type and, thus, also includes a shunt field winding 194, one end of both the shunt field winding and the series field winding being connected to a brush 195, which engages a commutator, not shown, of a wound armature 70. The other commutator brush 197 is connected to ground.

The other end of the shunt field winding 194 is connected to a wire 198 which is connected through a junction block 199 to a wire 200. Wire 200 is connected to switch contact 173 in the washer unit. Switch contact 175 of the washer unit is connected to a wire 201, the wire 201 being connected to a junction block 202 to a wire 203. Wire 193 is connected through the junction block 199 to a wire 204, the wire 204 being connected through the junction block 202 to a wire 205, and also being connected to a wire 206. The wire 206 is connected to switch contact 174 of the washer unit, the switch contact 176 being connected to ground.

The wire 189 is connected to one end of the washer unit electromagnet coil 166a, the other end of which is connected to a wire 207. The wire 207 is connected to a switch contact 208. Wire 205 is also connected to a switch contact 209. The switch contacts 208 and 209 can be bridged by a movable contact 210 which is connected to ground. The movable contact 210 constitutes a coordinated washer-wiper control switch which may be of the push button type. Thus, the bridging contact 210 is only moved into momentary engagement with contacts 208 and 209 to initiate a coordinated washing and drying cycle.

The wiper unit also includes a manual control switch comprising a movable bridging member 211 which is connected to ground as well as stationary contacts 212, 213 and 214. Stationary contact 212 is connected to wire 203, and a resistor 215 is connected between contacts 212 and 213. Contact 214 is connected to the wire 205. The resistor 215 can be connected in series with the shunt field winding 194 so as to reduce the current flow therethrough, and thus the flux produced by the shunt winding to obtain high speed motor operation. When the movable bridging member 211 is in the phantom position indicated by the word "high," resistor 215 is connected in series with the shunt field winding 194. When the bridging member is in the phantom position indicated by the word "low," the shunt field winding 194 is energized directly so as to obtain low speed motor rotation. When the bridging member 211 is in the full line position shown in FIGURE 18 the motor 66 is deenergized.

Operation of the wiper unit alone is as follows. When the bridging member 211 is moved to the low speed or the high speed position, the wiper unit electromagnet coil 107 is energized through bridging member 211, contact 214, wires 205, 204, 193, the coil 107, the wire 190, 188 and 187, the thermal overload switch 186 to the battery 185. Accordingly, the armature 110 will move into engagement with the core 108 so that the pin 126 is moved out of the plane of the crank arm 88. When the contact 122 engages the contact 124, the motor 66 will be energized from the battery through the thermal overload switch 186, the wire 187 and 188, the closed contacts 122 and 124, the wire 191, the series field winding 192 and through the armature 70. The shunt field winding 194 will likewise be energized through wires 198 and 200, closed switch contacts 173 and 175, the wire 201 and 203, switch contact 212 and directly to ground through switch contact 211 in the low speed position or through resistor 215 to ground in the high speed position.

As the motor 66 rotates, the worm gear drives the shaft 74 and the drive arm 98 rotates the crank arm 88 so that the round headed rivet 125 on the crank arm 88 will engage the rivet 119 on the armature plate 113 so as to move the armature 111 towards the core 108 of the electromagnet 106 whereupon the armature 111 will be attracted to the core 108 so that the shoulder 123 on the plate 113 will be disengaged from the eccentric lug 86 and moved into the plane of the eccentric lug 85. Accordingly, the eccentric 80 will be driven through 180° by the crank arm 88 through the Belleville washer until the lug 85 engages the shoulder 123. Thereafter, the eccentric 80 will remain in the position of FIGURE 10 and the wiper blades 28 and 29 will be moved throughout their wiping stroke as indicated by the angle B in FIGURE 1.

When it is desired to interrupt operation of the wiper unit, the bridging contact 211 is moved to the "off" position as shown in FIGURE 18. Movement of the bridging member 211 to the "off" position deenergizes the coil 107 of the electromagnet 106. Accordingly, the armature 110 is moved away from the core 108 by the spring 114, and the armature 111 is moved away from the core by the combined effort of springs 114 and 119. The motor 66 remains energized as the parking switch comprising contacts 122 and 124 is closed. However, movement of the armature 11 to the position of FIGURE 8 will move the shoulder 123 of the plate 113 out of engagement with the eccentric lug 85 and into the plane of the eccentric lug 86. Therefore, the rotating crank 88 will drive the eccentric 80 from the position of FIGURE 10 to the position of FIGURE 4, to shift the orbits of the crank pins 90 and 97, and when the crank arm 88 arrives at the position depicted in FIGURE 4 the cam surface thereof will engage the pin 126 and separate contacts 122 and 124 thereby deenergizing the motor 66 with the wiper blades 28 and 29 in the parked position as indicated in FIGURE 1.

Coordinated operation of the washer unit and the wiper unit to clean the windshield is as follows. The bridging contact 210 is closed momentarily, and by so doing the wiper unit electromagnet 106 is energized and the washer unit electromagnet 163 is energized. The coil 107 of the wiper electromagnet is energized from the battery through an overload switch 186, wires 187, 188 and 190, the coil 107, wires 193, 204, 205, switch contact 209 and 210. The coil 166a of the washer electromagnet is energized from the battery through the thermal overload switch 186, the wires 187, 189, the coil 166a, the wire 207 and switch contacts 208 and 210. When the wiper electromagnet 106 is energized the armature 110 is moved into engagement with the core 108 thereby permitting contacts 122 and 124 to engage so as to energize the motor 66. When the washer electromagnet 163 is energized, the armature 165 moves into engagement with the core 167 thereby permitting the driving pawl 149a to engage a tooth on the ratchet cam 154. As soon as the worm gear 73 rotates throughout 240°, the drive pawl 149a will have moved the ratchet cam 154 throughout a distance of one tooth so that follower 178 is disengaged from the cam surface 160 and contacts 174 and 176 are in engagement.

The bridging contact 210 can now be opened since the wiper electromagnet 106 is energized from the battery 185, through the terminal overload switch 186, wires 187, 188, 190, the coil 107, wires 193, 204, and 206 through the contacts 174 and 176. Similarly, the tang 169 of the armature ramp 165 engages the cam surface 158 so that the washer electromagnet 163 does not have to be energized. After movement of the ratchet cam 154 throughout a distance of one tooth, the follower 177 engages cam 159 to separate contacts 173 and 175. When contacts 173 and 175 are separated, the shunt field winding 194 is energized and thus the motor 66 operates at high speed. During substantially 180° of rotation of the ratchet cam 154 pump 130 is intermittently actuated, as afore described, and the wiper motor is operated at high speed for a predetermined number of wiper strokes constituting a washing cycle. After the ratchet cam has rotated through substantially 180° in the counterclockwise direction as viewed in FIGURE 18, the follower 177 is disengaged from the cam 159 whereupon contact 173 engages contact 175 to energize the shunt field winding 194 and reduce the speed of the motor 66 to the low speed setting. Simultaneously, the driving connection between the cam follower 148 and the pump rod 135 is interrupted by reason of follower 153 on the pump rod engaging cam surface 157. The wiper motor now operates at low speed for a predetermined number of strokes, which period constitutes a drying cycle. When the ratchet cam arrives at the position shown in FIGURE 18, the follower 178 engages the cam 160 to separate contacts 174 and 176 thereby deenergizing the wiper unit electromagnet 106. When the electromagnet 106 is deenergized the wiper blades will automatically move to the parked position, as aforedescribed, after which the motor 66 will be deenergized by separation of parking switch contacts 122 and 124.

The washer unit can also be actuated if the wiper unit is operating by closing switch 210. The motor 66 will then operate at high speed during the wash cycle, which speed is higher than the high speed manual setting since the shunt field winding 194 is open circuited by separation of switch contacts 173 and 175. During the drying cycle the motor 66 will operate at the low speed setting of the manual switch 211 which is lower than the motor speed during the wash cycle. After completion of the dry cycle the motor 66 will continue to operate at the preset manual speed.

From the foregoing it is apparent that the present invention provides a windshield cleaning system for wiping a windshield or for cleaning a windshield automatically with the use of a single motor. Moreover, the speed of the wiper motor is automatically controlled so that during the wash cycle the motor is operated at high speed and during the drying cycle the motor is operated at a lower speed. In addition, the present invention provides a wiping system wherein a unidirectional electric motor actuated a pair of cranks so as to impart synchronous asymmetrical movement to a pair of spaced wiper arms and blades together with a single eccentric for varying the orbital paths of the crank pins to achieve depressed parking.

While the embodiment of the invention as herein disclosed constitutes a preferred form, it is to be understood that other forms might be adopted, as may come within the scope of the claims which follow.

What is claimed is as follows:

1. A windshield cleaning system including, a washer unit, a wiper unit, control means for effecting conjoint operation of the washer unit and the wiper unit during a washing cycle with the wiper unit operating at a predetermined speed, means to continue operation of the wiper unit during a drying cycle for a predetermined time interval after the washer unit has stopped, and means operating said wiper unit at a speed different than said predetermined speed during the drying cycle.

2. A windshield cleaning system including, a washer unit, a wiper unit, control means for effecting conjoint operation of the washer unit and the wiper unit during a washing cycle with the wiper unit operating at high speed, means to continue operation of the wiper unit during a drying cycle for a predetermined number of strokes after the washer unit has stopped, and means for operating said wiper unit at a lower speed during the drying cycle.

3. A windshield cleaning system including, a wiper unit, a washer unit including a pump, a motor having continuous driving connection with said wiper unit and an interruptible driving connection with said pump, control means for said motor for actuating said wiper unit independently of said pump, secondary control means for said motor to effect conjoint operation of said wiper unit and said washer unit including means operable to automatically arrest said two units in sequential order to prolong wiper unit operation during a drying cycle after washer unit operation has stopped, and means for automatically operating said motor at a reduced speed during said drying cycle.

4. A windshield cleaning system including, a wiper unit, a washer unit including a pump, an electric motor having a continuous driving connection with said wiper unit and an interruptible driving connection with said pump, control means for effecting said conjoint operation of the wiper unit and the washer unit during a washing cycle with the motor operating at a predetermined speed, means to continue operation of the wiper unit for a predetermined time interval constituting a drying cycle after the washer unit has stopped, and means for automatically operating said motor at a speed different than said predetermined speed during the drying cycle.

5. A windshield cleaning system including, a wiper unit, a washer unit having a pump, an electric motor having a continuous driving connection with said wiper unit and an interruptible driving connection with said pump, a first circuit for energizing said motor to effect wiper unit operation independently of said washer unit, a second circuit for energizing said motor including means for establishing a driving connection between said motor and said pump to effect conjoint operation of said wiper unit and said washer unit during a washing cycle with the motor energized for high speed operation, cam means driven during said conjoint operation for interrupting the driving connection between said motor and said pump and continuing wiper operation for a predetermined time interval constituting a drying cycle, and switch means controlled by said cam means for automatically energizing said motor for lower speed operation during said drying cycle.

6. A crank assembly for windshield wiper actuating mechanism including, a unidirectional rotary shaft, an eccentric rotatably journalled on said shaft, said eccentric having a pair of diametrically opposed lugs thereon, a crank rotatably journalled on said eccentric having a crank pin at its outer end, a drive arm having its inner end connected with said shaft and having a slot adjacent its outer end for slidably receiving said crank pin to drivingly interconnect said shaft and said crank, a spring washer positioned between said crank and said eccentric for establishing a driving connection therebetween, and movable abutment means engageable with either of the lugs on said eccentric for controlling the position of said eccentric and determining the orbit of said crank pin.

7. A crank assembly for a windshield actuating mechanism including, a unidirectional rotary shaft, an eccentric rotatably journalled on said shaft, said eccentric having a pair of circumferentially spaced lugs thereon, one of said lugs being offset axially with respect to the other lug, a first crank arm rotatably journalled on said eccentric and having a crank pin at its outer end, a drive arm having its inner end connected with said shaft and having a slot adjacent its outer end for slidably receiving said crank pin to establish a driving connection between said shaft and said first crank arm, a second crank arm secured to the crank pin of said first crank arm and being oriented at an angle thereto, a second crank pin carried by the outer end of the second crank arm, a spring washer positioned between said first crank arm and said eccentric for establishing a frictional driving connection therebetween, and movable abutment means engageable with either of the lugs on said eccentric for controlling the position thereof to determine the orbits of said crank pins.

8. A crank assembly for a windshield wiper actuating mechanism including, a unidirectional rotary shaft, an eccentric rotatably journalled on said shaft, said eccentric having a pair of diametrically opposed lugs thereon, movable abutment means engageable with either of said lugs, a first crank arm rotatably journalled on said eccentric having a crank pin at its outer end, a drive arm having its inner end connected to said shaft and having a slot adjacent its outer end slidably receiving said crank pin for drivingly interconnecting said first crank and said shaft, a second crank arm secured to said first crank pin and oriented at an angle thereto when viewed in a direction substantially parellel to the axis of rotation of said shaft, a second crank pin carried by the outer end of said second crank arm, and a spring washer interposed between a first crank arm and said eccentric for establishing a frictional driving connection therebetween whereby the orbits of said crank pins are determined by which of said lugs on the eccentric engages said movable abutment means.

9. Windshield cleaning mechanism including, a unidirectional electric motor, a worm gear drivingly connected with said motor and having a cam surface thereon, a shaft attached to said worm gear, an eccentric rotatably journalled on said shaft, a crank rotatably journalled on said eccentric having a crank pin at its outer end, means operatively connecting the shaft and the crank arm for imparting rotation thereto, means controlling the position of said eccentric to control the orbit of said crank pin, a wiper unit, means interconnecting said crank pin and the wiper unit whereby said motor has a continuous driving connection with said wiper unit, a washer unit having a pump, means constituting an interruptible driving connection between said pump and said motor including said cam on the worm gear, means for establishing the driving connection between said motor and said pump to effect conjoint operation of the wiper unit and the washer unit during a washing cycle with the motor operating at a predetermined speed, means to continue operation of wiper unit for a predetermined time interval after the washer unit has stopped constituting a drying cycle, and means for automatically operating said motor at a speed different than said predetermined speed during the drying cycle.

10. Windshield wiper actuating and control mechanism including, a unidirectional electric motor, a shaft driven by said motor, an eccentric rotatably supported on said shaft, a crank arm rotatably supported on said eccentric and having a crank pin at its outer end, means operatively connecting the shaft and the crank arm for imparting rotation thereof, said eccentric having a pair of spaced lugs thereon, an electromagnet having an armature constituting a movable abutment means engageable with either of the lugs on said eccentric, means establishing a frictional driving connection between said eccentric and said crank arm, and a manual switch for controlling the energization of said electromagnet whereby when said electromagnet is energized one of said lugs engages said abutment means and when said electromagnet is deenergized the other of said lugs engages said abutment means to shift the orbit of said crank pin.

11. The mechanism set forth in claim 10 wherein said crank arm includes means engageable with said armature for moving it towards said electromagnet so as to assist in moving said armature upon energization of said electromagnet.

12. Windshield wiper actuating and control mechanism including, a unidirectional electric motor, a shaft driven by said motor, an eccentric rotatably supported on said shaft, a crank arm rotatably supported on said eccentric having a crank pin at its outer end, means drivingly interconnecting said crank arm and said shaft, an energizing circuit for said motor including a parking switch, an electromagnet having an armature for supporting said parking switch, said crank arm having a cam surface thereon for actuating said parking switch, and means for controlling the position of said eccentric to control the orbit of said crank pin whereby when the center of the orbit of said crank pin is located on one side of the axis of said shaft the cam surface on said crank arm will actuate said parking switch when the electromagnet is deenergized.

13. The mechanism set forth in claim 12 wherein said eccentric has a pair of spaced lugs thereon, means establishing a frictional driving connection between said crank arm and said eccentric, and wherein said armature means includes a second armature constituting the movable abutment means for said eccentric whereby the orbit of said crank pin is determined by which of said lugs engages said abutment means, one of said lugs engaging said abutment means when the electromagnet is energized and the other of said lugs engaging said abutment means when the electromagnet is deenergized.

14. A windshield cleaning system including, a washer unit, a wiper unit, control means for effecting conjoint operation of the washer unit and the wiper unit during a washing cycle with the wiper unit operating at a predetermined speed, means to continue operation of the wiper unit during a drying cycle for a predetermined number of strokes of said wiper unit after the washer unit has stopped, and means operating said wiper unit at a speed different than said predetermined speed during the drying cycle.

15. A crank assembly for windshield wiper actuating mechanism including, a unidirectional rotary shaft, an eccentric rotatably journalled on said shaft, said eccentric having a pair of circumferentially spaced lugs thereon, one of said lugs being offset axially with respect to the other lug, a crank rotatably journalled on said eccentric having a crank pin at its outer end, a drive arm having its inner end connected with said shaft and having a slot adjacent its outer end for slidably receiving said crank pin to drivingly interconnect said shaft and said crank, a spring washer positioned between said crank and said eccentric for establishing a driving connection therebetween, and movable abutment means engageable with either of the lugs on said eccentric for controlling the position of said eccentric and determining the orbit of said crank pin.

References Cited in the file of this patent

UNITED STATES PATENTS

| | | |
|---|---|---|
| 2,603,813 | Christensen | July 22, 1952 |
| 2,733,609 | Latta | Feb. 7, 1956 |
| 2,749,498 | Lautzenhiser et al. | June 5, 1956 |
| 2,816,316 | Oishei | Dec. 17, 1957 |
| 2,856,783 | Reese | Oct. 21, 1958 |
| 2,856,901 | Kvarnstrom et al. | Oct. 21, 1958 |
| 2,878,505 | Ziegler | Mar. 24, 1959 |
| 2,895,158 | Riester | July 21, 1959 |

FOREIGN PATENTS

| | | |
|---|---|---|
| 716,825 | Germany | Jan. 30, 1942 |
| 911,701 | Germany | May 17, 1954 |